May 22, 1945.    D. G. TAYLOR    2,376,525
PRESSURE ACTUATED VALVE
Filed Aug. 11, 1941

INVENTOR.
Daniel G. Taylor
BY
George H. Fisher
Attorney

Patented May 22, 1945

2,376,525

UNITED STATES PATENT OFFICE 2,376,525

PRESSURE ACTUATED VALVE

Daniel G. Taylor, Minneapolis, Minn., assignor to Minneapolis-Honeywell Regulator Company, Minneapolis, Minn., a corporation of Delaware Application August 11, 1941, Serial No. 406,351

18 Claims. (Cl. 236—10)

The present invention is directed broadly to valves which are operated by means of a pressure actuated motor, and is more particularly concerned with a pressure actuated valve in which the pressure in the actuating motor is controlled by a pilot valve assembly controlled jointly by a condition responsive device and a follow up arrangement whereby the main valve may be modulated in accordance with the value of the condition to which said condition responsive device responds.

In many valves of this type, particularly where they control the flow of gas to a burner, it is desirable to modulate the valve between a full open and minimum open position and to operate the valve rapidly between minimum open and closed positions.

It is therefore one of the main objects of this invention to provide a valve of the modulating type described above, with mechanism for operating it rapidly between closed and minimum open positions.

Another object of the invention is to make this mechanism in the form of a snap action device which operates on the pilot valve assembly, and which is normally inactive but which is rendered active when the main valve reaches a minimum open position.

Another object is to provide a valve of the follow up type, as described above, with a means for limiting the maximum pressure at the outlet of the main regulating valve.

A still further object is to adapt a valve of the above type to the control of the flow of gas to a burner for regulating the temperature of a heating medium, and modulating the position of the main gas valve in accordance with the temperature of the heating medium going to, and returning from, the space being heated.

Figure 1:
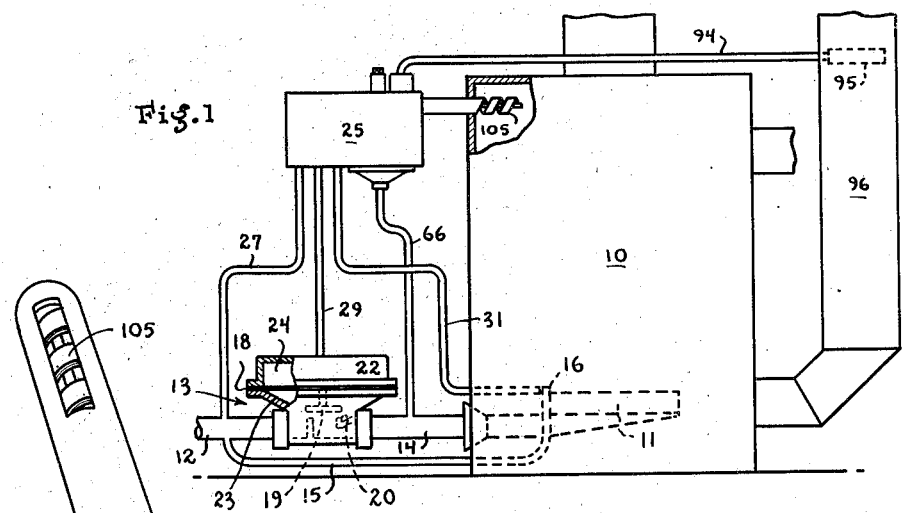
Figure 2:
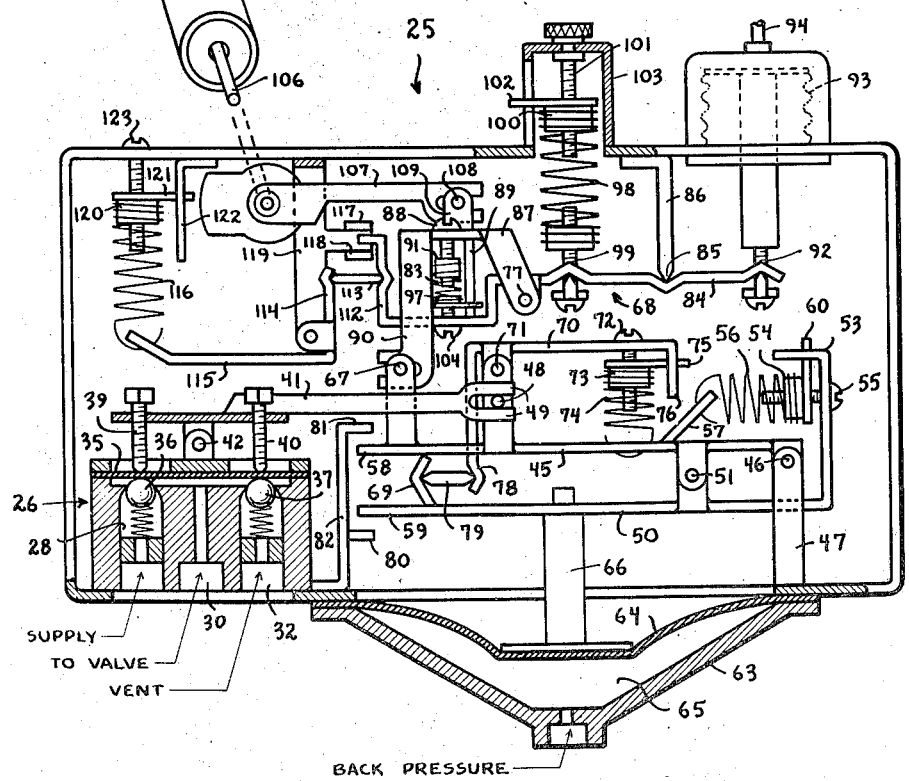

These and other objects will readily become apparent as the following specification is read in the light of the accompanying drawing, in which Fig. 1 illustrates my valve as applied to a conventional hot air furnace, and Fig. 2 illustrates more or less diagrammatically, with parts in section for the sake of clarity, my novel valve actuating mechanism.

Referring now to Fig. 1, the reference numeral 10 indicates a conventional hot air furnace which is heated by the usual form of gas burner 11. Gas is fed from a source of supply, not shown, through a supply pipe 12 to a diaphragm gas valve indicated generally at 13. The valve 13 controls the flow of gas in the supply pipe 12 through the pipe 14 to the gas burner 11. The by-pass pipe 15 connects the pilot burner 16 for the main burner 11 directly with the supply pipe 12.

The diaphragm gas valve 13 is of the conventional type which is provided with a diaphragm member 18 for controlling the position of the valve 19 which in turn cooperates with the valve seat 20 to control the flow of gas from the supply pipe 12 to pipe 14. A cover 22 peripherally clamps the diaphragm 18 against the valve body 23 to form a pressure chamber 24 above the diaphragm. The position of the valve is dependent upon the pressure in the pressure chamber 24. When the pressure in this chamber is equal to the pressure in the supply pipe 12, then the pressures on opposite sides of the diaphragm are equal and the diaphragm moves the valve to closed position by gravity. When the pressure chamber 24 is vented to the atmosphere the supply line pressure beneath the diaphragm 18 is effective to raise the diaphragm and move the valve to wide open position. For all pressures between these two limit pressures, the valve will have a corresponding position between fully opened and fully closed positions so that the rate of flow of gas past the valve may be regulated by regulating the pressure in the pressure chamber 24.

The reference numeral 25 indicates a casing which houses the operating mechanism for the pilot valve assembly indicated generally at 26 in Figure 2 which controls the pressure in the pressure chamber 24. The pipe 27 shown in Fig. 1 connects the supply pipe 12 directly with the valve chamber 28 shown in Fig. 2. The pipe 29 shown in Fig. 1 connects the pressure chamber 24 directly with the control chamber 30 shown in Fig. 2, and the pipe 31 shown in Fig. 1 connects valve chamber 32 shown in Fig. 2 directly with the atmosphere. For the sake of convenience, the pipe 31 terminates adjacent the gas burner 11 so that the gas bled through this pipe may be consumed.

The control chamber 30 shown in Fig. 2 is sealed from the atmosphere by means of the diaphragm 35. Supply valve 36 controls the flow of gas from the supply chamber 28 to the control chamber 30, and the exhaust valve 37 controls the flow of gas from the control chamber 30 to the atmosphere through pipe 31. Valves 36 and 37 are controlled respectively by means of screws 39 and 40 which are adjustably positioned in lever 41 which is pivotally mounted on the pilot valve assembly as shown at 42. With the lever in its horizontal position as shown in Fig. 2, both of the valves 36 and 37 are closed and therefore the pressure in the control chamber 30 and hence the pressure chamber 24 remains constant. When the lever 41 is rotated counterclockwise, the supply valve 36 is opened to increase the pressure in the pressure chamber 24 and hence move the valve 19 toward closed position. The return of lever 41 to horizontal position stops the increase in pressure in the chamber 24 and the valve 19 will then remain stationary. A clockwise rotation of lever 41 will open the exhaust valve 37 and permit the leakage of gas from chamber 24 to the atmosphere, hence causing a decrease in pressure in chamber 24 and consequently a movement of the valve 19 toward open position. It will therefore be seen that by properly controlling the lever 41, the pressure in the chamber 24 and hence the position of the valve 19 may be accurately controlled.

The rotation of the lever 41 is controlled by means of lever 45 which is pivotally mounted as shown at 46, to the bracket 47. Lever 45 is connected to lever 41 by means of pin 48 which is slidably received between the two legs 49 of the bifurcated end of the lever 41. Rotation of the lever 45 will therefore cause a corresponding rotation of the lever 41.

The lever 45 pivotally carries a second lever 50 as shown at 51. The right end of the lever 50 is provided with an upstanding portion 53 which adjustably carries a nut 54 by means of screw 55. One end of the tension spring 56 is connected to the nut 54 and the other end is looped into an ear 57 on lever 45. The function of the tension spring 56 is to tend to produce relative rotation between the two levers 45 and 50 which would tend to separate their two ends 58 and 59. The screw 55 has a screw-threaded engagement with the nut 54 so that rotation of screw 55 will produce a longitudinal movement of the nut 54 with respect to the spring 56, extension 60 on the nut 54 preventing rotation thereof due to the fact that it is slidably received in a slot in the portion 53 of the lever 50. Rotation of the screw 55 therefore adjusts the tension of the tension spring 56.

The cup-shaped member 63 circumferentially clamps a pressure responsive diaphragm 64 to the casing 25, thereby forming a pressure chamber 65 which is connected by means of pipe 66 shown in Fig. 1 with pipe 14 which is on the outlet side of the valve 19. The pressure in the chamber 65 is therefore equal to the outlet pressure of the valve 19, and variations in this pressure are communicated to the lever 50 by means of the rigid connection 66.

The lever 45 is connected by a pin and slot connection shown at 67 to an actuating lever indicated generally at 68. During normal operation, the lever 68 will exert a force on the lever 45 tending to rotate it downwardly and at the same time the effect of the outlet pressure on the diaphragm 64 is to rotate the lever 50 upwardly. Normally, these forces are sufficient to overcome the force exerted by spring 56 and maintain these levers in parallel relationship as shown in Fig. 2, at which time the ear 69 on lever 50 will engage the lever 45. Under these conditions, the two levers 45 and 50 will operate together as a unit to control the pilot valve actuating lever 41. Specifically if lever 68 exerts an increased downward force on lever 45 it will rotate the lever 41 and open the exhaust valve 37 which reduces the pressure in the pressure chamber 24 and the diaphragm 18 will start to move the valve 19 toward open position. This movement of valve 19 will result in an increase in the outlet pressure in pipe 14 which will result in the follow-up diaphragm 64 exerting an increased upward force on lever 50 which will return the lever 41 to horizontal position as shown in Fig. 2. Conversely, if the downward force exerted by lever 68 on lever 45 is reduced, the lever 41 will be rotated in a direction to open the supply valve 36 causing an increase in the pressure in the pressure chamber 24 and a movement of the valve 19 toward closed position by the diaphragm 18. The resultant reduction in outlet pressure will cause the follow-up diaphragm 64 to reduce its effect on lever 50 and the lever 41 will again return to horizontal position in which both the supply and exhaust valves 36 and 37 are closed. Thus it will be seen that a change in the pressure exerted by lever 68 or lever 45 will result in a movement of the valve 19 and that the resultant change in outlet pressure in pipe 14 will produce a follow-up action by the diaphragm 64 to stop the movement of the valve 19. All this time the two levers 45 and 50 are moving together as a unit.

Lever 70 is pivotally carried by the lever 45 as indicated at 71. At one end, the lever 70 rotatably carries a screw 72 which in turn is in screw-threaded engagement with the nut 73 which carries one end of a tension spring 74, the other end being looped into the lever 45. Rotation of screw 72 will vary the tension of spring 74 by causing a longitudinal movement of nut 73 which is prevented from turning by an extension 75 which is slidably received in a slot in the end 76 of the lever 70. The spring 74 tends to rotate lever 70 in a clockwise direction with respect to the lever 45 which would tend to move the end 78 of lever 70 toward the left. With the two levers 45 and 50 in the position shown in Fig. 2, the toggle link 79 which connects the end 78 of lever 70 with the ear 69 on lever 50 is parallel to the levers 45 and 50 and is in direct alignment with the pivotal connection 51 between levers 45 and 50. In other words, the toggle link 79 is in dead center position with respect to levers 45 and 50 and hence has no rotative effect on them at this time.

As stated above, as long as the outlet pressure and the pressure exerted by the lever 68 on lever 45 are above a predetermined value, they will hold the levers 45 and 50 together, as shown in Fig. 2, against the rotative force exerted by the tension spring 56. At this time the two levers are movable as a unit back and forth between the two stops 80 and 81 on the bracket 82. As soon as these two forces decrease below a predetermined value, the tension spring 56 acts to produce relative rotation between the levers 45 and 50 separating their two ends 58 and 59. This moves the toggle link 79 out of its dead center position at which time the spring 74 causes a rotation of lever 70 in a clockwise direction. The effect of the movement of toggle link 79 out of its dead center position is to add the force of spring 74 to that of spring 56 tending to separate the two ends 58 and 59 of the two levers 45 and 50. The spring 74 is so chosen that it will immediately cause the end 58 of lever 45 to engage stop 81 and the end 59 of lever 50 to engage the stop 80, such operation occurring with a snap action. This operation of course rotates the lever 41 to a position where the supply valve 36 of the pilot valve assembly will be wide open and the exhaust valve 37 closed, at which time the valve 19 will be closed and the pressure in the chamber 65 therefore reduced to atmospheric.

In order to open the valve 19, the lever 68 must exert a downward force on the lever 45 which is sufficient to overcome the effect of both of springs 56 and 74. As the lever 45 begins to rotate in a counter clockwise direction as a result of this force, the effect of spring 74 is progressively less, with the result that lever 45 moves with a snap action into engagement with the ear 69, at which time the toggle 79 will be in line with pivot 51 and the effect of spring 74 upon lever 45 will have been reduced to zero. At this time lever 41 will have opened the exhaust valve 37 and closed supply valve 36, thus relieving the pressure in chamber 24 and permitting valve 19 to open. When the outlet pressure in chamber 65 balances the downward force exerted by lever 68, diaphragm 64 will return the levers 45 and 50, as a unit, to their horizontal position, closing both the supply and exhaust valves 36 and 37. The mechanism will now function as before to maintain an outlet pressure dependent upon the downward force exerted by the lever 68.

The above described mechanism is so related that the spring 56 will be effective to operate the two ends 58 and 59 of levers 45 and 50 when the pressure in chamber 24 has been increased to such a point that it positions the valve in a minimum open position beyond which it would be undesirable to modulate the valve. In other words, it is desirable to move the valve uninterruptedly to closed position from this minimum open position and such action is provided for by the above described mechanism. On opening the valve, it will be noted that the lever 68 must overcome the action of the tension spring 56 and the force exerted by spring 74 through the toggle link 79 in order to close the supply valve 36 and open the exhaust valve 37, because this can be accomplished only by producing relative rotation between the two levers 45 and 50, lever 50 being held in engagement with the stop 80. In order to accomplish this, the condition to which the lever 68 is responsive must have attained a value corresponding to a certain open position for the valve. When this value is attained, lever 45 will be snapped into engagement with ear 69 on lever 50, thus opening the exhaust valve 37 and permitting valve 19 to open. The outlet pressure in chamber 65 will increase until the diaphragm 64 balances the force exerted by lever 68 at which time the two levers 45 and 50 will move as a unit as before.

The condition responsive lever indicated generally at 68 is composed of a first lever 84 pivoted on knife edge 85 of the bracket 86, lever 84 pivotally carrying a second lever 87 as shown at 77. Lever 87 carries a pin 89, the lower end of which is normally held against lever 84 by means of tension spring 83. Spring 83 is carried at its upper end by the nut 91 which is in turn adjustably carried by the screw 88 which extends loosely through an opening in the lever 87. The lower end of spring 83 is connected to the nut 97, a portion of which straddles pin 89 to prevent rotation of the spring 83 when the adjusting screw 88 is rotated. Nut 97 is supported by screw 104.

It will be seen by the above construction that the lever 84 transmits its force to lever 87 and hence to lever 45 through spring 83. Spring 83 therefore limits the rotative force which can be transmitted to lever 45 by lever 84 and hence limits the maximum outlet pressure of the valve 19. This maximum outlet pressure may be adjusted by adjusting spring 83 through the screw 88. One end of the lever 84 is adjustably connected as shown at 92 to a temperature responsive bellows shown in dotted lines at 93. This bellows communicates by capillary tube 94 with a bulb shown at 95 in Fig. 1 as being located in the return air duct 96 which leads from the space to be heated, not shown, back to the furnace 10 to be reheated. A main adjustment spring for the lever 84 is shown at 98 and is adjustably connected to the lever 84 as shown at 99. The upper end of this spring is connected to an adjustment nut 100 which screw-threadedly engages the adjustment screw 101. An extension 102 on the nut 100 slidably engages a slot in the adjustment housing 103 to prevent its rotation so that rotation of the screw 101 will vertically adjust the nut 100 and hence adjust the tension of the spring 98.

A bimetallic helix 105 is inserted in the bonnet of the furnace 10 shown in Fig. 1 in order to respond to the temperature of the air being delivered to the space to be heated. This helix is adapted to rotate shaft 106 of Fig. 2 which is in turn connected to an arm 107. Arm 107 is connected by means of a pin and slot connection shown at 108 to an ear 109 on the lever 87. It will be noted that the helix 105 is shown as extending from the right side of the casing 25 in Fig. 1. This is done merely for the sake of convenience, the preferred construction being as shown in Fig. 2 where the helix extends from the rear of the casing.

From the above, it will be seen that both the bimetal helix 105 and the temperature responsive bellows 93 affect the rotation of the lever 68, the resultant force exerted by this lever on the lever 45 being a function of both the bonnet temperature and the temperature of the return air. Specifically, an increase in temperature of the return air will cause a downward movement of the connection 92 as seen in Fig. 2 and hence a clockwise rotation of the lever 68. Assuming that the lever 41 is in horizontal position and both the supply and gas valves 35 and 36 closed, this action will open the supply valve 36 to increase the pressure in the pressure chamber 24 and hence move the valve 19 toward closed position. The resultant reduction in outlet pressure will decrease the pressure in the chamber 65 and reduce the force exerted by the diaphragm 64 on the lever 50. This reduction in force will counterbalance the reduction in force exerted on lever 45 by the lever 68 and hence the lever 41 will return to its horizontal position wherein both valves 36 and 37 are closed. This follow up action by the diaphragm 64 provides for a definite position of the valve for every force exerted by the lever 68 on lever 45 as a result of the temperatures at the bimetal 105 and the thermal bulb 95 which communicates with bellows 93. An increase in the bonnet temperature will cause the helix 105 to rotate shaft 106 in a counter-clockwise direction and therefore decrease the force exerted by lever 68 on lever 45. This will cause a further closure of the valve in the same manner as described above. A decrease in temperature at the helix 105 or bulb 95 will cause an opposite action, that is, an increase in the force exerted by the lever 68 on the lever 45 which will result in decreasing the pressure in the chamber 24 and hence increasing the outlet pressure in chamber 65 whereupon the diaphragm 64 will increase the pressure exerted on the lever 50 to balance the increased force exerted by lever 68 on lever 45.

As explained above, if the temperature should rise at the helix 105 and bulb 95, to the point where the valve 19 has been moved to a minimum open position, then the forces exerted on the lever 45 by the lever 68 and the counterbalancing or follow up force exerted on the lever 50 by the diaphragm 64 will be so reduced that the spring 56 will be capable of separating the ends 58 and 59 of the levers 45 and 50 and the spring 74 will come into action to cause this movement to take place with a snap action. This results in supply valve 36 being opened and remaining open to cause the valve 19 to move directly to closed position. This valve cannot be reopened until the temperature at the helix 105 and bulb 95 has decreased sufficiently to cause the lever 68 to exert sufficient force on lever 45 to overcome the effect of both springs 56 and 74 and rotate the lever 45 with a snap action against ear 69 on lever 50 and close supply valve 36 and open exhaust valve 37. This reduces the pressure in the chamber 24 causing the valve 19 to open and thereby increase the outlet pressure in chamber 65. Eventually this pressure will be sufficient to balance the force exerted by lever 68 at which time levers 45 and 50 will be returned to their horizontal positions as shown in Fig. 2.

The end 112 of the lever 84 is connected by means of a toggle link 113 with the end 114 of lever 115. Spring 116 tends to rotate the lever 115 in a clockwise direction and the toggle link 113, upon rotation of the lever 84 between its two limit positions as determined by the stops 117 and 118 on bracket 119, passes back and forth overcenter with respect to the pivot point 85 of lever 84. The purpose of this arrangement is not to produce a snap action but to introduce a force which will, to a certain extent, compensate the spring rates of the bimetal 105, adjusting spring 98, and bellows 93, and therefore increase the sensitivity of these members. If these members were sufficiently sensitive to produce the desired control, then the lever 115 with its toggle 113 would be unnecessary. The upper end of the spring 116 is connected to the nut 102 which is prevented from rotating by extension 121 slidably received in a slot in bracket 122. Adjusting screw 123 screw-threadedly engages the nut 120, and upon rotation causes a vertical adjustment thereof to adjust the tension of this spring.

It will thus be seen that I have provided a valve actuated mechanism wherein the pilot valve assembly or a pressure operated main valve is so controlled as to modulate the main valve between full open and minimum open positions which will cause uninterrupted movement of the main valve between minimum open position and closed position. Various changes and modifications of the above invention will doubtless occur to those who are skilled in the art, and I therefore wish it to be understood that I intend to be limited only by the scope of the appended claims and not by the specific embodiment disclosed.

I claim as my invention:

1. In combination, a main valve for controlling the flow of a fluid, a pressure responsive motor for modulating the valve, pilot valve means controlling the pressure in said pressure motor, a movable member for actuating said pilot valve means, a device responsive to a controlling condition and exerting a force on said member depending upon the value of said condition, follow up means responsive to the pressure on the outlet side of said main valve for balancing said force and therefore modulating the position of said main valve, means opposing both the force exerted by said condition responsive device and that exerted by said follow up means for actuating said pilot valve means in a direction to cause closure of said main valve when the forces exerted by said condition responsive device and said follow up means decrease below a predetermined valve, and means for rendering said last named means substantially ineffective to affect the position of said movable member until said forces decrease below said predetermined value.

2. In combination, a main valve for controlling the flow of a fluid, a pressure responsive motor for modulating the valve, pilot valve means controlling the pressure in said pressure motor, a movable member for actuating said pilot valve means, a device responsive to a condition and exerting a force on said member depending upon the value of said condition, follow up means responsive to the pressure on the outlet side of said main valve for balancing said force and therefore modulating the position of said main valve, and means including spring actuated snap action mechanism for actuating said pilot valve means with a snap action in a direction to cause closure of said main valve when the opposing forces exerted by said condition responsive device and said follow up means decrease below a predetermined value.

3. In combination, a main valve for controlling the flow of a fluid, a pressure responsive motor for modulating the valve, pilot valve means controlling the pressure in said pressure motor, a condition responsive device, connections between said condition responsive device and said pilot valve means whereby the latter can be actuated by the former, follow up means operating in response to pressure on the outlet side of the main valve and operative upon said connections, and power means in said connections opposing both said condition responsive device and said follow up means with a predetermined force for operating said pilot valve means to close said main valve when said main valve has been moved by said condition responsive device to a position where the forces exerted by said condition responsive device and said follow up means are below said predetermined force of the power means.

4. In combination, a main valve for controlling the flow of a fluid, a pressure responsive motor for modulating the valve, pilot valve means controlling the pressure in said pressure motor, a first pivoted lever for actuating said pilot valve means, a device responsive to a controlling condition for exerting a force on said first lever which is dependent upon the value of said condition, a second lever pivotally mounted on said first lever, and follow up means exerting a force on said second lever which is dependent upon the pressure on the outlet side of said main valve, and biasing means acting against both of said forces to tend to cause relative rotation of said levers, said two forces normally holding said two levers in predetermined relation against the biasing means whereby they move as a unit to actuate said pilot valve means and modulate the position of said main valve in accordance with the value of said condition, said biasing means being effective when said forces decrease below a predetermined value to cause relative rotation between said levers whereby said first lever actuates said pilot valve means to cause said main valve to move immediately to closed position.

5. In combination, a main valve for controlling the flow of a fluid, a pressure responsive motor for modulating the valve, pilot valve means controlling the pressure in said pressure motor, a first pivoted lever for actuating said pilot valve means, a device responsive to a controlling condition for exerting a force on said first lever which is dependent upon the value of said condition, a second lever pivotally mounted on said first lever, follow up means exerting a force on said second lever which is dependent upon the pressure on the outlet side of said main valve, biasing means acting against both of said forces to tend to cause relative rotation of said levers, said two forces normally holding said two levers in predetermined relation against the biasing means whereby they move as a unit to actuate said pilot valve means and modulate the position of said main valve in accordance with the value of said condition, said biasing means being effective when sad forces decrease below a predetermined value to cause relative rotation between said levers whereby said first lever actuates said pilot valve means to cause said main valve to move immediately to closed position, and snap action means inactive when said levers are in said predetermined position but active when said biasing means causes relative movement between said levers for moving said levers with a snap action.

6. In combination, a main valve for controlling the flow of a fluid, a pressure responsive motor for modulating the valve, pilot valve means controlling the pressure in said pressure motor, a first pivoted lever for actuating said pilot valve means, a device responsive to a controlling condition for exerting a force on said first lever which is dependent upon the value of said condition, a second lever pivotally mounted on said first lever, follow up means exerting a force on said second lever which is dependent upon the pressure on the outlet side of said main valve, a first spring carried by said levers and acting against both forces to produce relative rotation between said levers, said two forces normally holding said two levers in predetermined relation against the force exerted by said first spring whereby said two levers move as a unit to actuate said pilot valve means and modulate the position of said main valve in accordance with the value of said condition, snap action means including a second spring and toggle link carried by said levers, said toggle link being substantially in dead center position when said two levers are in said predetermined relation. said first spring being effective when said forces decrease below a predetermined value to cause relative rotation between said levers thereby moving said toggle link out of dead center position and rendering said second spring operative to cause said levers to move with a snap action.

7. In combination, a main valve for controlling the flow of a fluid, a pressure responsive motor for modulating the valve, pilot valve means controlling the pressure in said pressure motor, a movable member for actuating said pilot valve means, a first condition responsive device, a second condition responsive device, a second member connected to said two condition responsive devices for exerting a force on said movable member which is dependent upon the average of the values of the conditions to which said two devices respond, follow up means responsive to the pressure on the outlet side of said main valve for balancing said force and therefore modulating the position of said main valve, means opposing both the force exerted by said condition responsive device and that exerted by said follow up means for actuating said pilot valve means in a direction to cause closure of said main valve when the forces exerted by said condition responsive devices and said follow up means decrease below a predetermined value, and means for rendering said last named means substantially ineffective to affect the position of said movable member until said forces decrease below said predetermined value.

8. A control system for gas burners comprising in combination, a gas burner for heating a fluid to be circulated through a space to be heated, a main valve controlling the flow of gas to said burner, a pressure motor for actuating said valve, pilot valve means controlling the pressure in said motor, a movable member for operating said pilot valve means, a first thermostat responsive to the temperature of the heated fluid, a second thermostat responsive to the temperature of the fluid returned from said space, means connected to said two thermostats for exerting a force on said member dependent upon the average of the values of said two temperatures, and follow up means exerting a force on said member dependent upon the pressure on the outlet side of said main valve whereby said member operates said main valve to modulate it in accordance with the average of said two temperature values.

9. A control system for gas burners comprising in combination, a gas burner for heating a fluid to be circulated through a space to be heated, a main valve controlling the flow of gas to said burner, a pressure motor for actuating said valve, pilot valve means controlling the pressure in said motor, a movable member for operating said pilot valve means, a first thermostat responsive to the temperature of the heated fluid, a second thermostat responsive to the temperature of the fluid returned from said space, means connected to said two devices for exerting a force on said member dependent upon the average of the values of said two temperatures, follow up means exerting a force on said member dependent upon the pressure on the outlet side of said main valve whereby said member operates said main valve to modulate it in accordance with the average of said two temperature values, and means for actuating said pilot valve means in a direction to cause closure of said main valve, said last named pilot actuating means being operative only when the forces exerted by said thermostats and said follow up means decrease below a predetermined value.

10. In combination, a main valve for controlling the flow of a fluid, a pressure responsive motor for modulating the valve, pilot valve means controlling the pressure in said pressure motor, a movable member for actuating said pilot valve means, a condition responsive device exerting a force on said member depending upon the value of said condition, follow up means responsive to the pressure on the outlet side of said main valve for balancing said force, and therefore modulating the position of said main valve, and means opposing both said condition responsive device and said follow up means for actuating said pilot valve means in a direction to cause closure of said main valve, said last named pilot actuating means being operative only when the forces exerted by said condition responsive device and said follow up means decrease below a predetermined value, said condition responsive device being operative thereafter to actuate said pilot valve means to open said main valve, said pilot actuating means preventing said follow up means becoming effective on said pilot valve means until after said forces have increased to a predetermined value.

11. In combination, a main valve for controlling the flow of a fluid, a pressure responsive motor for modulating the valve, pilot valve means controlling the pressure in said pressure motor, movable connecting means for actuating said pilot valve means, said connecting means comprising a pair of relatively movable members which are biased apart, means responsive to a controlling condition acting on said connecting means with a force dependent upon the value of said condition, follow-up means responsive to the pressure on the outlet side of said main valve exerting a balancing force on said connecting means dependent upon the value of said pressure, said condition responsive means and follow-up means normally being effective to hold said movable members together in a predetermined relation against their bias and to position said connecting means in accordance with the relative value of said forces, said members moving apart by reason of their bias whenever said two forces decrease below a predetermined value, and connecting means between one of said members and said pilot valve means effective to actuate said pilot valve means to close said main valve whenever said members are apart.

12. In combination, a main valve for controlling the flow of a fluid, a pressure responsive motor for modulating the valve, pilot valve means controlling the pressure in said pressure motor, movable connecting means for actuating said pilot valve means, said connecting means comprising a pair of relatively movable members, snap acting biasing means tending to move said members apart, means responsive to a controlling condition acting on said connecting means with a force dependent upon the value of said condition, follow-up means responsive to the pressure on the outlet side of said main valve exerting a balancing force on said connecting means dependent upon the value of said pressure, said condition responsive means and follow-up means normally being effective to hold said movable members together in a predetermined relation against the action of said biasing means and to position said connecting means in accordance with the relative value of said forces, said biasing means being effective to move said members apart with a snap action whenever said two forces decrease below a predetermined value, and connecting means between one of said members and said pilot valve means effective to actuate said pilot valve means to close said main valve whenever said members are apart.

13. In combination, a main valve for controlling the flow of a fluid, a pressure responsive motor for modulating the valve, pilot valve means controlling the pressure in said pressure motor, movable connecting means for actuating said pilot valve means, said connecting means comprising a pivoted lever, biasing means for rotating said lever to a position where it actuates said pilot valve means to close said vave, means responsive to a controlling condition acting on said connecting means with a force dependent upon the value of said condition, and follow-up means responsive to the pressure on the outlet side of said main valve exerting a balancing force on said connecting means dependent upon the value of said pressure, said condition responsive means and follow-up means normally being effective to render said biasing means inoperative and to position said connecting means solely in accordance with the relative value of said forces, said biasing means being effective to rotate said lever to a position where it actuates said pilot valve mans to close said valve whenever said two forces decrease below a predetermined value.

14. In combination, a main valve for controlling the flow of a fluid, a pressure responsive motor for modulating the valve, pilot valve means controlling the pressure in said pressure motor, movable connecting means for actuating said pilot means, said connecting means comprising a first pivoted lever and a second lever pivotally carried by said first lever, means biasing said levers apart, means responsive to a controlling condition acting on said connecting means with a force dependent upon the value of said condition, follow-up means responsive to the pressure on the outlet side of said main valve exerting a balancing force on said connecting means dependent upon the value of said pressure, said condition responsive means and follow-up means normally being effective to hold said levers together in a predetermined relation against their bias and to position said connecting means in accordance with the relative value of said forces, said biasing means being effective to move said levers apart whenever said two forces decrease below a predetermined value, stop means to limit movement of one of said levers, and connections between the other of said levers and said pilot valve means effective to actuate said pilot valve means to close said main valve when said one lever is moved against said stop.

15. In combination, a main valve for controlling the flow of a fluid, a pressure responsive motor for modulating the valve, pilot valve means controlling the pressure in said pressure motor, movable connecting means for actuating said pilot valve means, said connecting means comprising a first pivoted lever and a second lever pivotally carried by said first lever, means biasing said levers apart, means responsive to a controlling condition acting on said connecting means with a force dependent upon the value of said condition, follow-up means responsive to the pressure on the outlet side of said main valve exerting a balancing force on said connecting means dependent upon the value of said pressure, said condition responsive means and follow-up means normally being effective to hold said levers together in a predetermined relation against their bias and to position said connecting means in accordance with the relative value of said forces, said biasing means being effective to move said levers apart whenever said two forces decrease below a predetermined value, snap action means associated with said biasing means to cause said biasing means to move said levers with a snap action, stop means to limit movement of one of said levers, and connections between the other of said levers and said pilot valve means effective to actuate said pilot valve means to close said main valve when said one lever is moved against said stop.

16. In combination, a main valve for controlling the flow of a fluid, a pressure responsive motor for modulating the valve, pilot valve means controlling the pressure in said pressure motor, movable connecting means for actuatng said pilot valve means, said connecting means comprising a first pivoted lever and a second lever pivotally carried by said first lever, means biasing said levers apart, means responsive to a controlling condition acting on said connecting means with a force dependent upon the value of said condition, follow-up means responsive to the pressure on the outlet side of said main valve exerting a balancing force on said connecting means dependent upon the value of said pressure, said condition responsive means and follow-up means normally being effective to hold said levers together in a predetermined relation against their bias and to position said connecting means in accordance with the relative value of said forces, said biasing means being effective to move said levers apart whenever said two forces decrease below a predetermined value, snap action means associated with said biasing means, said snap action means comprising a toggle element disposed in a dead center position when said levers are held in said predetermined relation and being effective when said levers start to move apart to cause them to move with a snap action, stop means to limit movement of one of said levers, and connections between the other of said levers and said pilot valve means effective to actuate said pilot valve means to close said main valve when said one lever is moved against said stop.

17. In combination, a valve movable between two extreme positions for controlling the flow of a fluid, means for positioning said valve including a movable connecting means and effective to cause said valve to assume a position intermediate said extreme position dependent upon the position of said connecting means, said connecting means comprising a pair of relatively movable members, means biasing said relatively movable members apart, means responsive to a controlling condition acting on said connection means with a force dependent upon the value of said condition, follow-up means responsive to the pressure on the outlet side of said valve exerting a balancing force on said connecting means dependent upon the value of said pressure, said condition responsive means and follow-up means normally being effective to hold said movable members together in a predetermined relation against said biasing means and to position said connecting means in accordance with the relative value of said forces, and means including said biasing means moving said members apart and thereby causing movement of said valve to an extreme position whenever said two forces decrease below a predetermined value.

18. In combination, a condition control device movable between two extreme positions, movable connecting means connected to said control device for actuating the same, said connecting device for actuating the same, said connecting means comprising a pair of relatively movable members, means biasing said relatively movable members apart, means responsive to a controlling condition acting on said connecting means with a force dependent upon the value of said condition, follow-up means responsive to a further condition directly and substantially immediately effected by said control device, said follow-up means being effective to exert a balancing force on said connecting means dependent upon the value of said pressure, said first named condition responsive means and follow-up means normally being effective to hold said movable members together in a predetermined relation against said biasing means and to position said connecting means and said control device intermediate said extreme position and in accordance with the relative value of said forces, said members being moved apart by said biasing means whenever said two forces decrease below a predetermined value, and means including said biasing means functioning under such conditions to cause said control device to move to one extreme position.

DANIEL G. TAYLOR.